(12) United States Patent
Miller et al.

(10) Patent No.: US 7,094,498 B2
(45) Date of Patent: Aug. 22, 2006

(54) BATTERY SEPARATOR WITH BATTLEMENTED RIB

(75) Inventors: Eric H. Miller, Philpot, KY (US); J. Kevin Whear, Utica, KY (US)

(73) Assignee: Daramic, Inc., Charlotte, NC (US)

( * ) Notice: Subject to any disclaimer, the term of this patent is extended or adjusted under 35 U.S.C. 154(b) by 295 days.

(21) Appl. No.: 10/161,345

(22) Filed: May 31, 2002

(65) Prior Publication Data

US 2003/0224245 A1 Dec. 4, 2003

(51) Int. Cl.
*H01M 2/16* (2006.01)
*H01M 2/18* (2006.01)
*H01M 2/14* (2006.01)

(52) U.S. Cl. ................... 429/143; 429/129
(58) Field of Classification Search ............ 429/143, 429/129, 136
See application file for complete search history.

(56) References Cited

U.S. PATENT DOCUMENTS

| 3,351,495 | A | | 11/1967 | Larsen et al. |
| 3,917,772 | A | | 11/1975 | Hollenbeck |
| 4,000,352 | A | | 12/1976 | Hollenbeck et al. |
| 4,165,349 | A | * | 8/1979 | Sandelli .............. 264/29.1 |
| 4,368,243 | A | * | 1/1983 | O'Rell et al. .......... 429/147 |
| 4,927,722 | A | * | 5/1990 | Bohnstedt et al. ...... 429/147 |
| 5,230,843 | A | | 7/1993 | Howard et al. |
| 5,558,952 | A | | 9/1996 | Knauer |
| 5,716,734 | A | | 2/1998 | Nakano |

FOREIGN PATENT DOCUMENTS

WO   WO 01/13442   2/2001

* cited by examiner

*Primary Examiner*—Patrick Joseph Ryan
*Assistant Examiner*—Julian Mercado
(74) *Attorney, Agent, or Firm*—Hammer & Hanf, P.C.

(57) ABSTRACT

A separator for a storage battery is a microporous membrane having a back web and a battlemented rib standing on the back web.

15 Claims, 3 Drawing Sheets

BATTERY SEPARATOR WITH BATTLEMENTED RIB

FIELD OF THE INVENTION

This invention is directed to a separator for a storage battery.

BACKGROUND OF THE INVENTION

A battery separator is used to separate the battery's positive and negative electrodes, and is typically microporous so that ions may pass therethrough to the positive and negative electrodes. In lead/acid storage batteries, either automotive or industrial batteries, the battery separator is typically a microporous polyethylene separator having a back web and a plurality of ribs standing on the back web. See: Besenhard, J. O., Editor, *Handbook of Battery Materials*, Wiley-VCH Verlag GmbH, Weinheim, Germany (1999), Chapter 9, pp. 245–292. The separators for automotive batteries are typically made in continuous lengths and rolled, subsequently folded, and sealed along its edges to form pouches that receive the electrodes for the batteries. The separators for industrial (traction) batteries are typically cut to a size about the same as an electrode plate.

U.S. Pat. No. 3,917,772 illustrates a method of making a lead/acid battery separator sheet from a plastic material. In this method, the sheet is calender molded to form ribs and/or projections. Referring to U.S. Pat. No. 3,917,772's FIGS. 2 and 3, ribs 29 and 31 have a solid profile. Referring to U.S. Pat. No. 3,917,772's FIGS. 4 and 5, discrete projections 45 and 49 are formed by rounded pits in the calendering rolls 12 and 13. U.S. Pat. No. 4,000,352 illustrates a lead/acid battery separator characterized by an interrupted pattern of discrete separator projections standing on a back web. Each projection has a circular or oval shape. U.S. Pat. No. 5,558,952 illustrates a lead/acid battery separator having a plurality of discrete ribs with no intermediate connecting walls. U.S. Pat. No. 5,716,734 illustrates a lead/acid battery separator having a plurality of ribs, each with a solid profile. PCT Publication WO 01/13442 illustrates a lead/acid battery separator having at least one vertical rib and a plurality of studs. The studs are truncated cones and their bases are flush with the back web. The ribs have a solid profile.

While the foregoing prior art, that is those having the projections, studs, or discontinuous ribs, have advanced the art, they are deficient because of their inability to prevent the formation of gas pockets. In a typical lead/acid battery separator, the separator has a ribbed face (i.e., with the primary ribs) and a back face (i.e., without ribs or a plurality of small or secondary ribs). The negative electrode (plate) is placed adjacent to the back face, and the positive electrode (plate) rests on the ribs of the ribbed face. Once a battery is sufficiently charged and current is continually applied (i.e., overcharging), hydrogen is generated at the negative plate, and oxygen is generated at the positive plate. As hydrogen is formed at the negative plate, it may push the separator away from the negative plate thereby forming a gas channel or pocket. A channel allows the hydrogen gas to escape, which is good; a pocket, on the other hand, prevents the escape of gas, which is bad because the pocket becomes an area of infinite resistance in the battery. Furthermore, if the separator's back web is pushed to contact the positive plate, the back web can oxidize and a hole can form.

Accordingly, there is a need to improve these battery separators.

SUMMARY OF THE INVENTION

A separator for a storage battery comprises a microporous membrane having a back web and a battlemented rib standing on the back web.

DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION OF THE INVENTION

Figure 1:
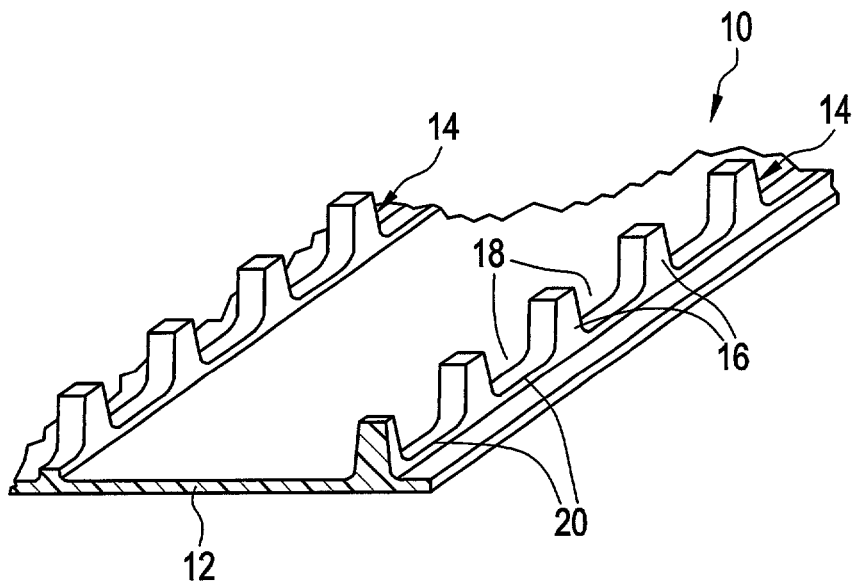
FIG. 1 is an isometric view of a separator made according to the instant invention.

Referring to the drawings wherein like numerals indicate like elements, there is shown in FIG. 1 a battery separator 10. Separator 10 has a back web 12 and battlemented ribs 14. Battlemented rib 14 has solid portions 16, open portions 18, and a short wall 20 located below the open portion 18 and between and connecting solid portions 16.

Separator 10 is a microporous membrane. Separator 10 may be made of any suitable material, for example, polyolefin, rubber, polyvinyl chloride (PVC), phenolics, cellulosics, or combinations thereof. Separator 10 is preferably made from a polyolefin and most preferably a filled polyolefin. For example, see U.S. Pat. Nos. 3,351,495, 3,917,772, and 5,230,843, each of which is incorporate herein by reference. The filled polyolefin separator is preferably made from a mixture of polyethylene, filler, and processing oil. These ingredients are mixed and extruded into a sheet, calendered molded, leached to remove the oil, and thereby forming the final separator (e.g., a roll good or cut-to-length). The polyethylene is preferably ultrahigh molecular weight polyethylene (UHMWPE) or a blend UHMWPE and another material, such as a lower molecular weight polyolefin (e.g., high density polyethylene (HDPE)) or rubber. The filler is preferably precipitated silica. The mixture may also contain processing aids, as is well known. Typically, pore diameters are below 1 micron, porosities are around 60%, and electrical resistances are about 50–200 m$\Omega$ cm$^2$. The foregoing is not limiting on the present invention, but is merely illustrative of the typical separator for a storage battery. Also see: Besenhard, Ibid., incorporated herein by reference.

Figure 2:
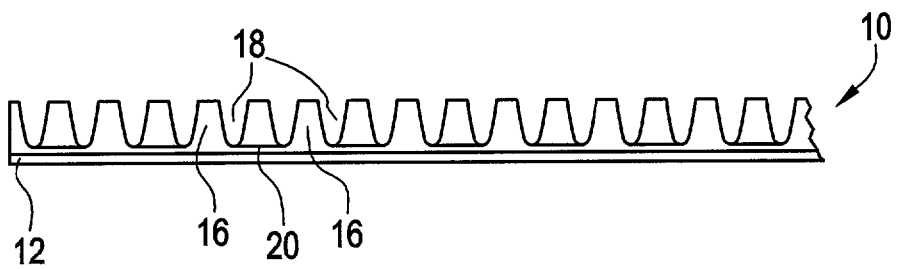
FIG. 2 is a side view of the separator shown in FIG. 1.
Figure 3:
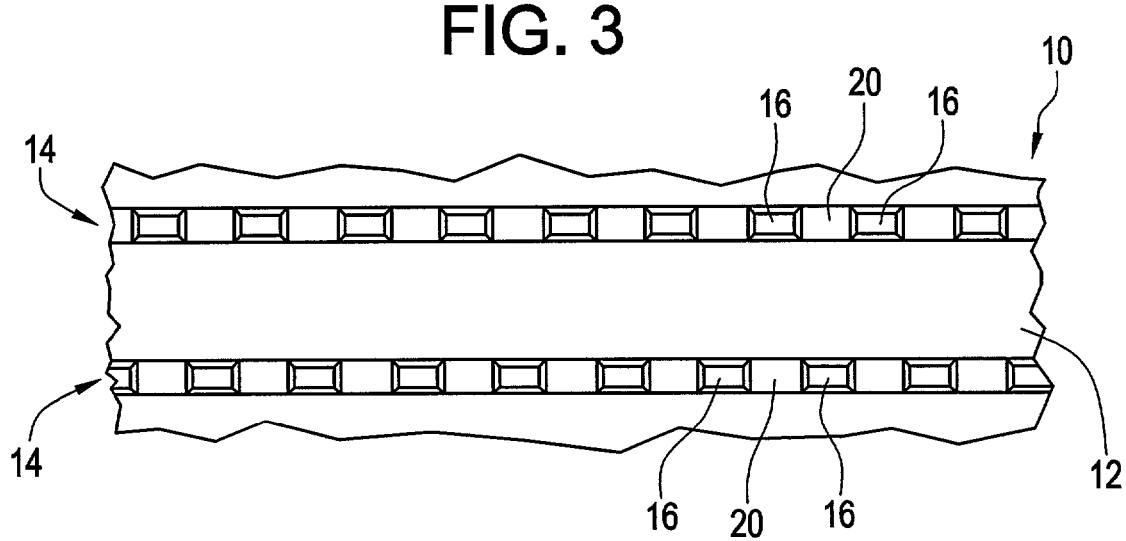
FIG. 3 is a top plan view of the separator shown in FIG. 1.

In FIG. 2, battlemented ribs 14 are preferably deregistered so that solid portion 16 of one rib is aligned with the open portion 18 of the second rib. In FIG. 3, the preferred shape of solid portion 16 is shown. Preferably, each solid portion 16 is a truncated pyramid. It is understood that the invention is not so limited and any other shape may be used.

When this invention is compared to typical commercial products, the mass of the total separator is reduced, the acid volume available within the battery is increased, and the manufacturing speed of the separator is increased. Moreover, gas pockets formed between the back web and the negative electrode are minimized or eliminated. By creating open portions in the rib, the overall mass of the separator is reduced. Reduction in the mass of the separator allows reduced manufacturing costs for the separator. Also, by creating the open spaces in the battlemented rib 14, the amount of acid present in the battery may be increased. Manufacturing speeds can be increased because greater surface area is available, thereby reducing the time necessary to leach the processing oil necessary to make the membrane microporous. Finally, the inclusion of the short wall 20 between solid portions 16 of the battlemented rib 14 increases the strength of the back web 12 so that the separator will bow and preferentially form vertical channels for the gas to escape and not form gas pockets in the open space of the battlemented rib as is prone in the vertical space in a discontinuous rib.

Figure 4:
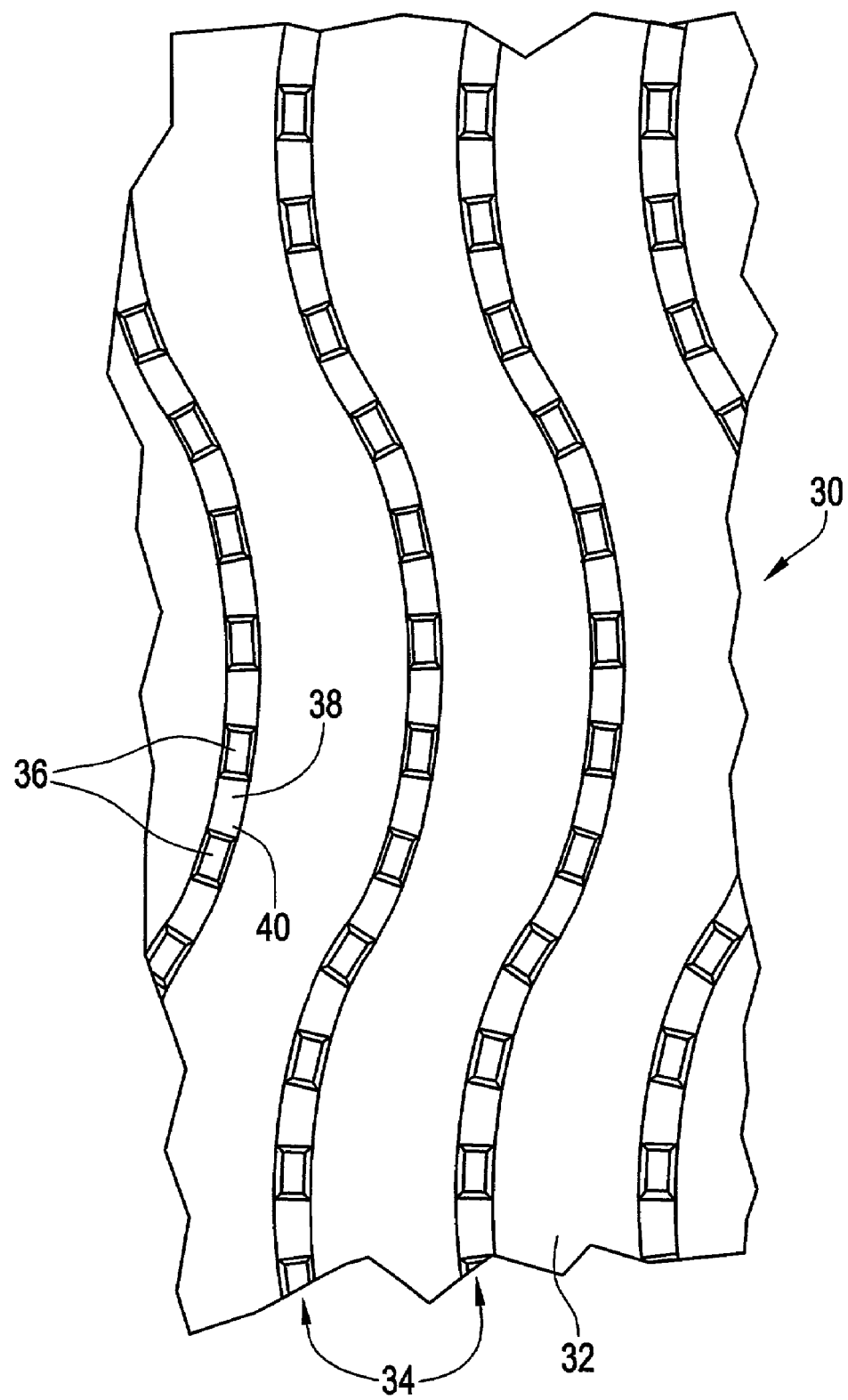
FIG. 4 is a top plan view of an alternate embodiment of the present invention.

In FIG. 4, an alternate embodiment of separator 30 is shown. Separator 30 includes back web 32 and a plurality of battlemented ribs 34 standing thereon. Battlemented rib 34 includes solid portions 36, open portion 38 between solid portions 36, and a short wall 40 located below open space 38 and between solid portions 36. In this embodiment, separator 30 has non-linear or wavy or curved rib 34.

Figure 5:
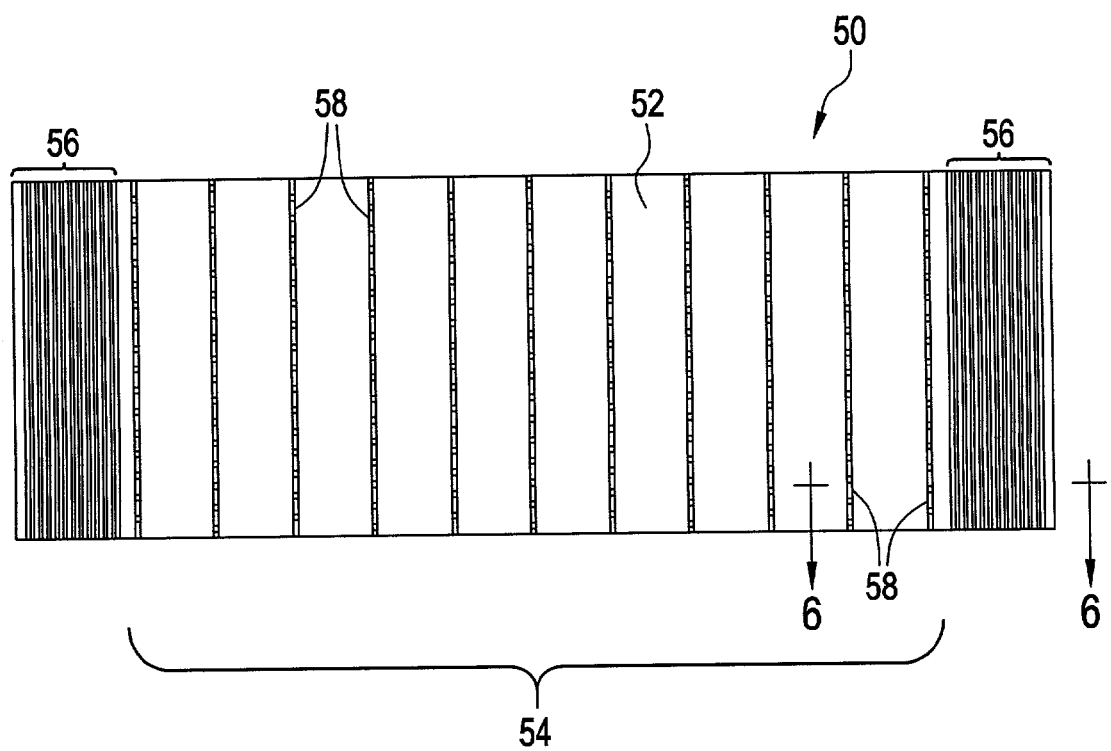
FIG. 5 is a top plan view of another embodiment of the present invention.
Figure 6:
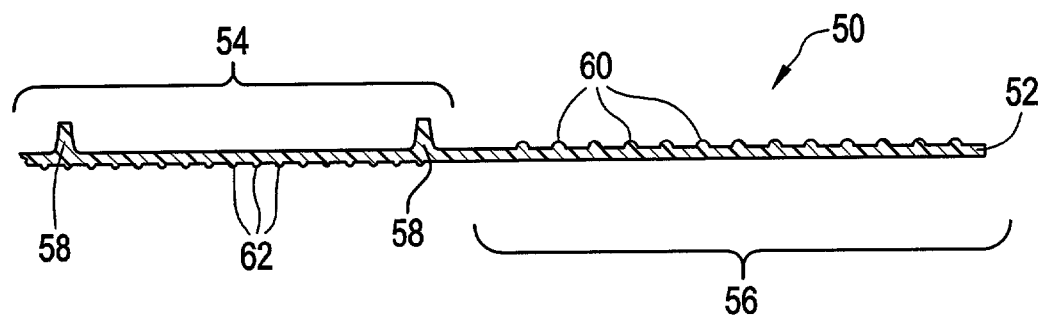
FIG. 6 is a sectional view of the embodiment shown in FIG. 5 taken generally along sectional lines 6—6.

Referring to FIGS. 5 and 6, a battery separator 50 is illustrated. Separator 50 includes a back web 52, central portion 54, and lateral edge portions 56. Preferably, ribs 58 (i.e., primary ribs) of central portion 54 are battlemented ribs as previously discussed. Ribs 60 of lateral edge portions 56 may be battlemented ribs, but this is not necessary. Ribs 62 on the backside of web 52 may be battlemented, but this is not necessary.

The present invention may be embodied in other forms without departing from the spirit and the essential attributes thereof, and, accordingly, reference should be made to the appended claims, rather than to the foregoing specification, as indicated the scope of the invention.

What is claimed is:

1. A battery separator comprising:
   a membrane having a back web and at least two rows of a battlement rib standing on a same side of the back web.

2. The battery separator according to claim 1 wherein said ribs being either straight or wavy.

3. The battery separator according to claim 1 wherein each said battlemented rib having a solid portion.

4. The battery separator according to claim 3 wherein said solid portion having a truncated pyramidal shape.

5. The battery separator according to claim 1 wherein said membrane being selected from the group consisting of polyolefin, rubber, polyvinyl chloride, phenolic, cellulosic, or combinations thereof.

6. The battery separator according to claim 5 wherein said membrane being a polyolefin material.

7. A storage battery made with the battery separator of claim 1.

8. The battery separator according to claim 1, wherein said rows of said battlemented ribs being deregistered.

9. A battery separator comprising a membrane having a back web and at least two rows of a battlement rib standing on a same side of the back web, wherein said battlement rib has at least two solid portions and a short wall therebetween.

10. The battery according to claim 9 wherein said ribs being either straight or wavy.

11. The battery separator according to claim 9 wherein said solid portions having a truncated pyramidal shape.

12. The battery separator according to claim 9 wherein said membrane being selected from the group consisting of polyolefin, rubber, polyvinyl chloride, phenolic, cellulosic, or combinations thereof.

13. The battery separator of claim 9 wherein said membrane being a polyolefin material.

14. A storage battery made with the battery separator of claim 9.

15. The battery separator according to claim 9, wherein said rows of said battlemented ribs being deregistered.

* * * * *